United States Patent [19]
Miyakita

[11] 4,114,079
[45] *Sep. 12, 1978

[54] ROTARY CUTTER DRIVE CONTROL WITH ELECTRIC MOTOR

[75] Inventor: Hiroshi Miyakita, Toyonaka, Japan

[73] Assignee: Ichiro Miyakita, Japan

[*] Notice: The portion of the term of this patent subsequent to Mar. 29, 1994, has been disclaimed.

[21] Appl. No.: 748,318

[22] Filed: Dec. 7, 1976

Related U.S. Application Data

[63] Continuation-in-part of Ser. No. 459,620, Apr. 10, 1974, Pat. No. 4,015,183.

[30] Foreign Application Priority Data

Oct. 4, 1973 [JP] Japan .................. 48-111679
Sep. 13, 1976 [JP] Japan .................. 51-110513

[51] Int. Cl.² .............................. G05B 19/28
[52] U.S. Cl. ........................... 318/601; 318/342
[58] Field of Search .......................... 318/601

[56] References Cited

U.S. PATENT DOCUMENTS

| 3,949,286 | 4/1976 | Appelgren | 318/601 |
| 4,015,183 | 3/1977 | Miyakita | 318/601 |

Primary Examiner—Robert K. Schaefer
Assistant Examiner—Michael K. Mutter
Attorney, Agent, or Firm—Hill, Gross, Simpson, Van Santen, Steadman, Chiara & Simpson

[57] ABSTRACT

An apparatus for controlling the speed of a rotary cutter driven by an electric motor for cutting to length a sheet material continuously supplied to the rotary cutter. Means are provided for applying to the electric motor a dc voltage whose amplitude is proportional to the rate of the number of pulses of a pulse train said pulse train being synchronous with the feed rate of the sheet material when the blades of the rotary cutter pass the cutting position, means for progressively decreasing the number of pulses of the pulse train, the decrease in the number of pulses beginning at a predetermined position beyond the cutting position and being effected at a rate following a first pattern, means for progressively lowering the rate of the decrease in accordance with a second pattern when the number by which the pulses are decreased reaches a first predetermined value, and means for suspending the decrease when the number by which the pulses are decreased reaches a second predetermined value.

7 Claims, 12 Drawing Figures

ROTARY CUTTER DRIVE CONTROL WITH ELECTRIC MOTOR

CROSS-REFERENCE TO RELATED APPLICATION

This is a continuation-in-part application of co-pending U.S. patent application Ser. No. 459,620 filed Apr. 10, 1974 now U.S. Pat. No. 4,015,183 by the same inventor.

The present invention relates to a drive control apparatus for a rotary cutter or more particularly to such a drive control apparatus with an electric motor.

A rotary cutter is used for cutting sheets of material fed in at a fixed speed to a predetermined length. In a corrugator for producing corrugated cardboard, for example, a rotary cutter is provided at the output side of the corrugator so as to cut into sheets of predetermined length a laminated corrugated sheet material continuously delivered at the output side of the corrugator. Since the length to which the corrugated sheet is required to be cut varies with types of products, the rotary cutter must be adjustable accordingly. Also, it is essential that the rotary cutter rotates in synchronism with the feed rate of the corrugated sheet regardless of the length to which it is cut and the cutter edges run at the same speed as that of the sheet at least while they meet for cutting, resulting in the mechanically and electrically complex speed control apparatus of the conventional rotary cutter as well as large variation in length of the produced sheets. In an attempt to overcome this disadvantage, we propose the use of an electro-hydraulic pulse motor, the speed of which can be relatively easily controlled, for driving the rotary cutter. Sometimes, however, the turning effort of the electro-hydraulic pulse motors presently in general use are not sufficiently great to compete with the large inertia which often results from sudden acceleration and deceleration of the rotary cutter.

In the present invention, this problem is solved by controlling the rate of pulses applied to the pulse motor according to a desired pattern of speed variation of the cutter edges of the rotary cutter as abovementioned.

The same effects are also achieved by using a conventional electric motor instead of the electro-hydraulic pulse motor and applying to the electric motor a dc voltage instead of the controlled pulses, the amplitude of the dc voltage being proportional to the pulse rate of the controlled pulses.

Accordingly, it is an object of the present invention to provide a drive control apparatus with an electric motor which eliminates as practicably as possible the need for sudden acceleration or deceleration on one hand and is capable of accurate speed control on the other.

The above and other objects, features and advantages will be made apparent by the detailed description taken in conjunction with the accompanying drawings, in which.

Figure 1:
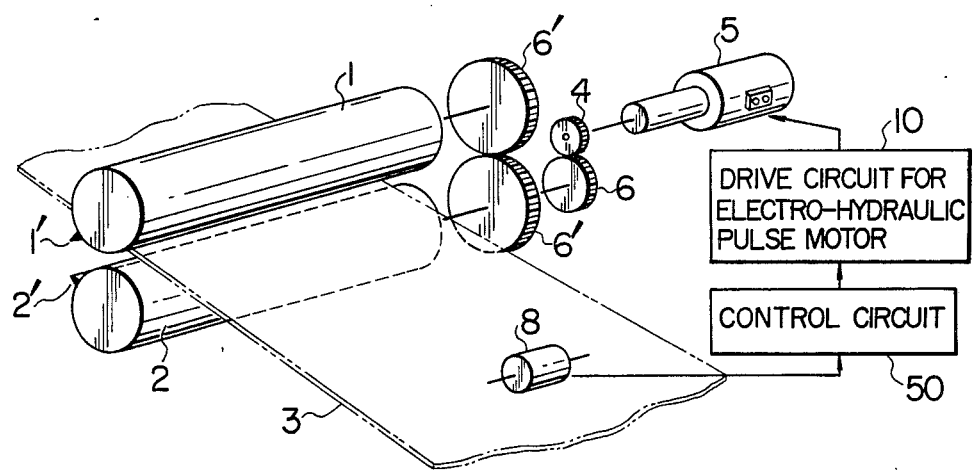
FIG. 1 is a diagram for explaining an embodiment of the present invention applied to an electro-hydraulic pulse motor.

Referring to FIG. 1, reference numerals 1 and 2 show rotary drums of a rotary cutter which are driven by an electro-hydraulic pulse motor 5 through gears 4, 6 and 6'. Numeral 3 shows a sheet strip to be cut by the rotary cutter.

In order to cut the sheet strip 3 to length, the rotary cutter must make exactly one rotation as a predetermined length of the corrugated sheet is fed in. However, while the rotary blades 1' and 2' pass the cutting points, they must maintain exactly the same peripheral speed as the feed rate of the sheet. Otherwise, the cut sheet may be kicked forward by the cutter blades or the arriving sheet strip to be cut tends to collide with the cutter blades, thus often damaging the section of cut sheets. This fact may be neglected when a sheet of soft material is involved but poses a serious problem in the case of a sheet made of corrugated cardboard or thin metal.

The characteristics of the electro-hydraulic pulse motor will be now explained. The electro-hydraulic pulse motor which was originally developed as a servo mechanism for numerically controlled machine tools is now used in various fields of applications because of its accurate speed control characteristics. Electro-hydraulic pulse motors now available on the market include the Electro-Hydraulic Pulse Motor Type EHPM made by Fujitsu FANVC Co. of Japan. This motor, containing a hydraulic servo mechanism, is such that a hydraulic valve operates in response to incoming electric pulses thereby to drive the motor hydraulically. The Electro-Hydraulic Pulse Motor Type EHPM with rated power of 10 HP, for example, has a rotational angle of 1.2° for each input pulse and is capable of following up to 8000 pulses applied per second. Thus, the use of this motor enables the speed of a hydraulic motor to be controlled at will in accordance with incoming electric pulses.

The above-described electro-hydraulic pulse motor as used for driving the rotary cutter will be explained with reference to FIG. 2.

Figure 2:
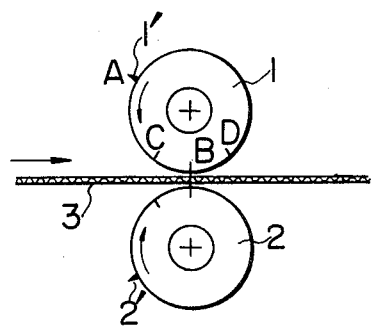
FIG. 2 is a diagram for explaining the operation for controlling the motion of the rotary cutter.

In FIG. 2, a certain ratio determined by the length of the sheet to be cut exists between the number of pulses applied to the electro-hydraulic pulse motor during the period of time from the starting of rotation of blades 1' and 2' of the rotary drums 1 and 2 at point A until the next arrival thereof at point A, and the length of the sheet strip passing point B as converted into the number of pulses.

The peripheral speed of the blades is required to be synchronous with the feed rate of the corrugated sheet at and in the vicinity of point B where the cutter blades meet each other.

By way of explanation, it is assumed that the rotary cutter makes one rotation for every $n$ pulses applied to the electro-hydraulic pulse motor.

The applied pulses are fed by a length-measuring pulse generator 8 disposed on the sheet strip in well-known manner. Assuming that the length-measuring pulse generator 8 produces one pulse for each 1 mm flow of the sheet strip, $n$ pulses are produced therefrom and therefore the electro-hydraulic pulse motor makes one rotation for each sheet strip flow of $n$ mm, with the result that the cutter rotary drums connected to the electro-hydraulic pulse motor makes one rotation thereby to cut the sheet strip to the length of n mm. For convenience of illustration, it has been assumed that the electro-hydraulic pulse motor is coupled with the drums in the gear ratio of one to one.

Let the diameter of each of the rotary cutter drums be R, and then the circumference thereof is the peripheral length covered by blades 1' and 2' from the time they pass point A at one time until they next arrive the same point as $\pi R$. If the value of n or R is determined so that $\pi R$ is n, application of n pulses causes the cutter drums to move one revolution and make one cut so that the sheet strip is cut to the length of $\pi R$.

In the event that the sheet strip is to be cut into sheets of the length $(n + \alpha)$ mm, $(n + \alpha)$ pulses are generated by the length-measuring pulse generator for each length $(n + \alpha)$ mm of the sheet strip. These pulses are required to be reduced to n pulses per sheet length of $(n + \alpha)$ mm for their application to the electro-hydraulic pulse motor since the pulse motor and hence the cutter drums makes one rotation for each n pulses, the gear ratio being 1 to 1.

On the other hand, the peripheral speed of the blades of the rotary cutter is required, as mentioned earlier, to be synchronous with the feed rate of the belt sheet at least at and in the vicinity of point B where they meet for cutting. In other words, the electro-hydraulic pulse motor must be driven at or in the vicinity of point B by a part of the $(n + \alpha)$ pulse train generated by the length-measuring pulse generator and be supplied with n pulses for one rotation. Thus, the rotary cutter is required to be driven by pulses corresponding to the $(n + \alpha)$ pulse train during the short interval from point C to point D in order to assure that the cutter rotation is in synchronism with the feed rate of the belt sheet. However, $\alpha$ pulses are subtracted from the $(n + \alpha)$ pulses for the remaining rotational period in such a manner as to apply a total of n pulses to the pulse motor for one rotation thereof.

In this way, $\beta$ pulses are applied to the electro-hydraulic pulse motor at the same rate as that of the $(n + \alpha)$ pulse train so as to rotate the cutter blades at the same peripheral speed as the feed rate of the sheet strip for the short interval including point B. For the remaining interval D-A-C, by contrast, $(n - \beta)$ pulses resulting from the subtraction of $\alpha$ pulses from the remaining $(n + \alpha - \beta)$ pulses of the $(n + \alpha)$ pulse train are applied to the electro-hydraulic pulse motor. As a result, the rotary cutter which is decelerated for the interval D-A-C is again accelerated to a level synchronous with the feed rate of the belt sheet at point C. The density of $(n + \beta)$ pulses applied to the electro-hydraulic pulse motor is distributed in such a manner that the acceleration and deceleration rates do not exceed the capacity of the electro-hydraulic pulse motor. The variation of the thinning rate, that is the ratio of the number $\alpha$ of pulses removed to the number of pulses making up the original pulse train, is proportional to the rate of acceleration or deceleration. The thinning rate is progressively increased or decreased respectively for deceleration and acceleration in such a way that the variation does not exceed the deceleration or acceleration capacity of the electro-hydraulic pulse motor. Considering this thinning rate as a function of the number p of the input pulses included in the pulse train $(n + \alpha)$, the thinning rate is increased with the increase in p for deceleration, whereas it is decreased with the decrease in p for acceleration. The variation pattern of the thinning rate with p as a function may be expressed as $F_1 = f(p)$ for deceleration and $F_2 = g(p)$ for acceleration. The product of the gradient of the function and the input pulse p represents a decelerated or accelerated condition. In the $(n + \alpha)$ pulse train representing the maximum drive speed, for example, the gradient of the patterns $F_1 = f(p)$ and $F_2 = g(p)$ is determined in such a manner as to keep within the capacity of the electro-hydraulic pulse motor the deceleration and acceleration thereof shown by the above-mentioned product, and the thinning rate is changed in accordance with such patterns. As a matter of fact, if such patterns involve an increase or decrease in the manner of arithmetical or geometrical progression with the increase of p, the thinning circuit can be easily produced by the use of synchronous rate multiplier integrated circuits available on the market. It is also not difficult to change the thinning rate in accordance with an increasing or decreasing pattern subject to a certain relationship if not in the manner of arithmetical or geometric progression.

It is assumed now that p is the number of input pulses produced each cut of the sheet and p is the number of input pulses applied to the electro-hydraulic pulse motor for each rotation thereof. Assume also that the sheet is cut to the length of $(n + \alpha)$ mm, that one input pulse is given each one mm in movement of the sheet and that the rotary cutter makes one rotation by every n pulses applied thereto. Then equations $p = n + \alpha$, and $P = n$ are established. Therefore, the number of pulses to be removed from every p input pulses is $p - P = \alpha$. As a result, the electro-hydraulic pulse motor is driven in accordance with the following first, second and third patterns:

(1) Until the application of a total of $p_1$ input pulses from the time point when the cutter passes point D, a pulse train including pulses in the number resulting from the thinning out of the input pulses in accordance with the equation $F = f(p)$ is applied to the electro-hydraulic pulse motor. In the meantime, the pulse motor is decelerated, the value of $p_1$ being selected in such a way that a total of $\alpha/2$ pulses are reduced. Therefore, the number of pulses applied to the electro-hydraulic pulse motor is $P_1 = p_1 - \alpha/2$ as compared with the number $p_1$ of input pulses.

(2) During the time period from $p_1$ to $p_2$ in the total number of input pulses applied, the rate of pulse reduction is lessened according to the pattern $F_2 = g(p)$, so that the density of pulses applied to the electro-hydraulic pulse motor is progressively increased until it becomes equal to that of the input pulse train or synchronizes therewith at point $p_2$ which point is so selected that a total of $\alpha/2$ pulses are removed during the time period when the pulse number changes from $p_1$ to $p_2$. As a result, pulses in the number of $P_2 = (p_2 - p_1) - \alpha/2$ are applied to the electro-hydraulic pulse motor during the time period corresponding to the change in the number of pulses from $p_1$ to $p_2$.

(3) Finally, during the time period corresponding to the change in the number of input pulses from $p_2$ to $(n + \alpha)$, a pulse train as dense as or synchronous with the input pulse train is applied to the electro-hydraulic pulse motor.

In this way, the total number of pulses applied to the electro-hydraulic pulse motor from the beginning until a total of $(n + \alpha)$ input pulses are involved is expressed as $$P = P_1 + P_2 + \{(n + \alpha) - p_2\} = (p_1 - \alpha/2) + \{(p_2 - p_1) - \alpha/2\} + \{(n + \alpha) - p_2\} = n$$

In other words, the electro-hydraulic pulse motor and the rotary cutter make one rotation, the gear ratio being 1 to 1, while $(n + \alpha)$ input pulses have been applied, with the result that the sheet has been fed by $(n + \alpha)$ mm thereby to cut it to the length of $(n + \alpha)$ mm.

It will be apparent from the foregoing description that the sheet can be cut to length as desired. Of course, the peripheral speed of blades must be synchronous with the feed rate of the sheet while the sheet is being cut with the blades, and therefore rotary cutter is controlled in such a manner that point B is included in the step (3) above. Assuming that pulses in the number of $\gamma$ are applied to the electro-hydraulic pulse motor during the period corresponding to the step (3) above, it is necessary to establish the equations $F = f(p)$ and $F = g(p)$, taking into consideration the fact that the maximum number $\alpha$ of pulses to be removed during acceleration and deceleration is $P - \gamma$.

In this way, the blades rotate exactly in synchronism with the feed rate of the sheet thereby enabling the cutting thereof to the length of nR when $\alpha$ is zero.

In this case, there is no need at all for acceleration nor deceleration but the value of $\alpha$ may be increased with the desired length into which the sheet is to be cut. Further, the number $\alpha$ is varied with the number of input pulses and therefore a sharp increase in the rate of acceleration or deceleration is prevented, thus making it possible to use an electro-hydraulic pulse motor of a relatively small capacity with a cutter of a relatively large capacity.

An example of a circuit to which the above-mentioned operating principle is applied will be explained with reference to FIG. 3. Reference numeral 8 shows a pulse generator for generating pulses in the number proportional to the length by which the sheet is fed. The pulses generated by the pulse generator 8 are applied to a pulse divider circuit 9 thereby changing the number of pulses so as to make it suitable for driving the electro-hydraulic pulse motor. The preceeding description involves $n$ pulses being generated by the pulse generator for the minimum length to which the sheet is to be cut so that the electro-hydraulic pulse motor causes the rotary cutter to make one rotation in response to $n$ pulses. However, pulses generated by the pulse generator are not necessarily required to be in that number, since the division ratio of the pulse divider 9 may be determined in such a manner that the rotary cutter makes one rotation in response to the number of pulses generated by the pulse divider 9 for the minimum length to which the sheet is to be cut.

Numeral 11 shows a point D detector for generating an output signal when the blades of the rotary cutter reach point D in FIG. 2. The point D is apart from the cutting position B by a predetermined angle. The detector 11 is well-known in the prior art and may be any one of a group of well-known proximity detectors utilizing, for example, a mechanically operated microswitch, a photo-electric element, or a magnetic pickup. Numeral 12 shows a gate circuit which is turned on upon application thereto of the output of the point D detector 11, whereupon the output pulse from the pulse divider circuit 9 is applied to an OR circuit 17 through the thinning circuit 15 following the pattern of $F = f(p)$. At the same time, the thinning circuits 15 and 16 and the difference counter 18 are reset thereby to turn off the gate circuit 14, while the gate circuit 13 is also turned off by the output from the comparator 21 which will be described later. The output of the OR gate 17 is applied to the drive circuit 10 for the electro-hydraulic pulse motor where it is amplified to an appropriate level for the purpose of driving the electro-hydraulic pulse motor. Thus the electro-hydraulic pulse motor is decelerated.

The output of the OR gate 17 is applied also to the difference counter 18. The difference counter 18 is reset by the output from the point D detector 11 and counts the difference between the output pulses of the pulse divider 9 and those of the OR gate 17 from the time when the rotary cutter passes point D. The number counted by the difference counter 18 thus represents the number of pulses removed as mentioned earlier. The difference thus counted is applied to the comparators 20 and 21. Numeral 19 shows a calculator for calculating the number of pulses to be removed in response to the cutting length of the sheet applied thereto and produces signals representing $\alpha/2$ and $\alpha$ which are applied respectively to the comparators 20 and 21. The calculator 19 is arranged to calculate the numbers $\alpha = (n + \alpha) - n$ and $\frac{1}{2}\alpha$, where $(n + \alpha)$ is the number of pulses corresponding to the predetermined cut length and $n$ is the number of pulses to be applied to the pulse motor each rotation thereof as described hereinafter. $(n + \alpha)$ may be manually set in the calculator 19 according to the sheet length of the products to be cut by means of push buttons or dials in well-known manner, while $n$ may be permanently preset in the calculator or be manually set. In any event, such calculators are well-known in the art and commercialized. The comparator 20 compares the output of the difference counter 18 with $\alpha/2$ and produces an output signal when they are equal to each other, thereby turning off the gate 12 and turning on the gate 13. As a result, the output pulse from the pulse divider 9 is applied through the gate 13 to the thinning circuit 16 following the pattern of $G = f(p)$, whereupon a pulse train thinned out according to pattern of $G = f(p)$ is applied through the OR gate 17 to the drive circuit 10 for the electro-hydraulic pulse motor for driving the same. The result is the acceleration of the pulse motor.

This condition continues until the number counted by the difference counter reaches the value of $\alpha$, when the comparator 21 produces an output thereby to turn off and on the gates 13 and 14 respectively. Thereafter, the output pulses from the pulse divider circuit are applied in their entirety to the drive circuit 10 through the OR gate 17. Thus the electro-hydraulic pulse motor drives the rotary cutter at a speed synchronous with the feed rate of the sheet. When the blades of the rotary cutter reach point D, the above-mentioned cycle of operation is resumed.

In the case where the length to which the sheet is to be cut is very long, the value $(n + \alpha)$ assumes a high number, resulting in the number $\alpha$ being increased. As a consequence, the pulse train is thinned out to such an extent that the thinning circuit 15 produces no output, making further removal of pulses impossible. The electro-hydraulic pulse motor is stopped temporarily and driven again by the output pulses from the thinning circuit 16 when the total number of pulses removed reaches $\alpha/2$ after a short period of time.

In the case where the length to which the sheet is to be cut corresponds to $n$ pulses, the calculator 19 applies "0" signals to both the comparators 20 and 21, so that the difference counter is reset by the output of the point D detector 11, while the comparators 20 and 21 produce output signals thereby to turn off and on the gates 12 and 13 respectively. As a result, the output of the pulse divider is applied in its entirety through the gate 14 and OR gate 17 to the drive circuit 10.

Figure 4:
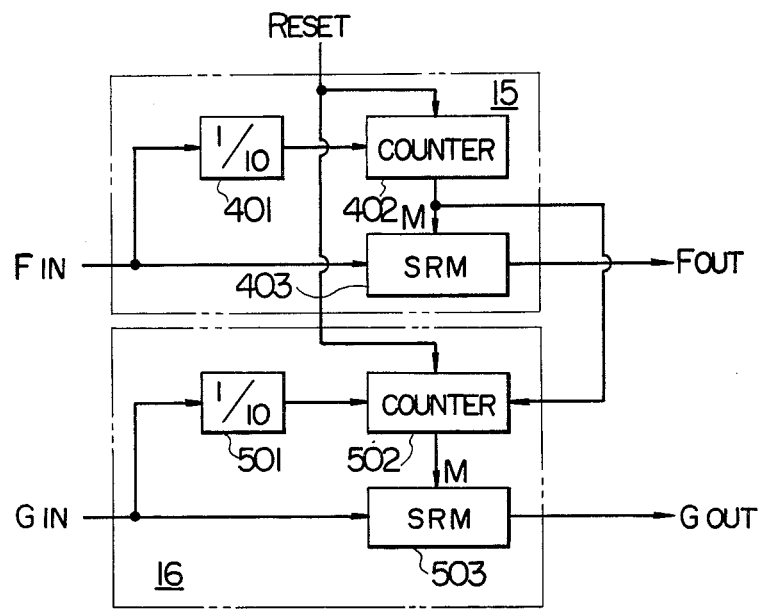
FIGS. 4 and 5 are block diagrams showing thinning circuits.

The thinning circuits 15 and 16 will be explained more in detail with reference to FIG. 4. The thinning circuit 15 following the pattern of $F = f(p)$ includes a one-tenth divider circuit 401, a subtraction counter 402 and a synchronous rate multiplier (SRM) 403 which consists of, say, SN 74167 made by Texas Instruments Inc. There is a relation Fout = M × Fin/10 between the input and output of SRM 403, where M shows a rate input applied from the counter 402. Assume that an input signal is applied to SRM with the counter 402 reset at 10 initially. M is 10 for the first to 9th input pulses and Fout is 9. Upon application of the 10th pulse, M becomes 9 which remains as it is until the application of the 19th pulse. Output pulses produced in response to 10 pulses from 10th to 19th pulses are Fout = 9 × 10/10 = 9. Upon receipt of the 20th pulse, M changes to 8 and remains at the same value from 20th to 29th pulses. Thus, with the increase in input pulses, the number of output pulses Fout is progressively decreased thereby to decelerate the electro-hydraulic pulse motor.

In like manner, the thinning circuit 16 following the pattern of $F = g(p)$ includes a one-tenth divider circuit 501, an addition counter 502 and an SRM 503. Like SRM 403, there is a relation Gout = M × Gin/10 between input and output pulses Gin and Gout of SRM 503. The counter 502, which is initially reset, is set at the same number as the content of the subtraction counter 402 upon receipt of the output therefrom. By way of explanation, it is assumed that the content of counter 402 is M = 2 when a total of $\alpha/2$ pulses out of the input pulses are removed by the thinning circuit 15. The gate 12 is opened and the gate 13 is closed, and therefore the input pulses are applied through the gate 13 to the thinning circuit 16 following the pattern $G = f(p)$. At this instant, the counter 502 is also set at M = 2, so that output Gout from SRM 503 remains the same as Fout immediately before change-over and the speed also remains unchanged. When 10 pulses are applied as Gin, M becomes 3 and Gout is also increased. Thus Gout is progressively increased, thereby steadily accelerating the electro-hydraulic pulse motor.

Figure 5:
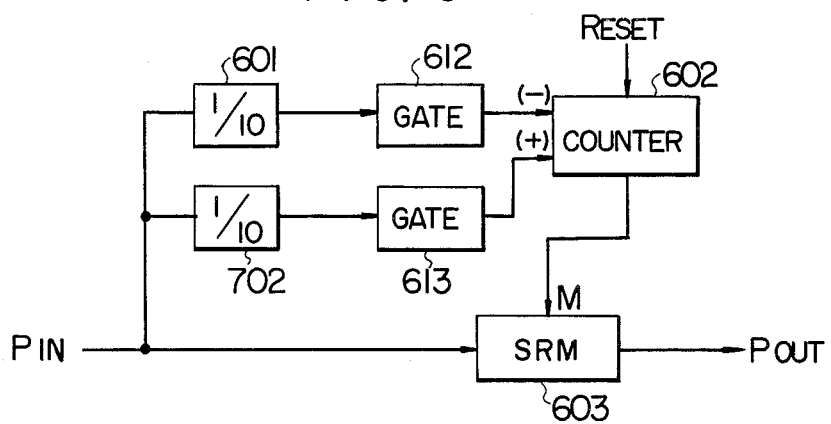

Another embodiment shown in FIG. 5 comprises, instead of separate thinning circuits 15 and 16, a common thinning circuit and therefore a common SRM in place of SRM's 403 and 503. The number of pulses applied through the gate 612 to the counter 602 is subtracted from the content of the counter 602, while the number of pulses applied through the gate 613 to the counter 602 is added to the content thereof. The switch-over of input pulses as effected from the thinning circuit 15 to the thinning circuit 16 in the embodiment of FIG. 3 is not required in the embodiment under consideration which is provided with a common thinning circuit. The counter 602 functions as a subtraction counter and its M is progressively decreased with the number of its output pulses Pout decreased during deceleration. However, it operates as an addition counter with its M number of output pulses progressively increased during acceleration. Since the value of M remains unchanged at the change-over, smooth change-over operation can be achieved.

It will be apparent that although each of the divider circuits 401, 501, 601 and 702 consists of a one-tenth divider circuit, the variation of M with the input pulses may be changed by changing the division ratio. For example, in the event that the division ratios of the divider circuits 401 and 501 are respectively 1/10 and ⅛, the variation rate of M is different for deceleration and acceleration.

Figure 6A:
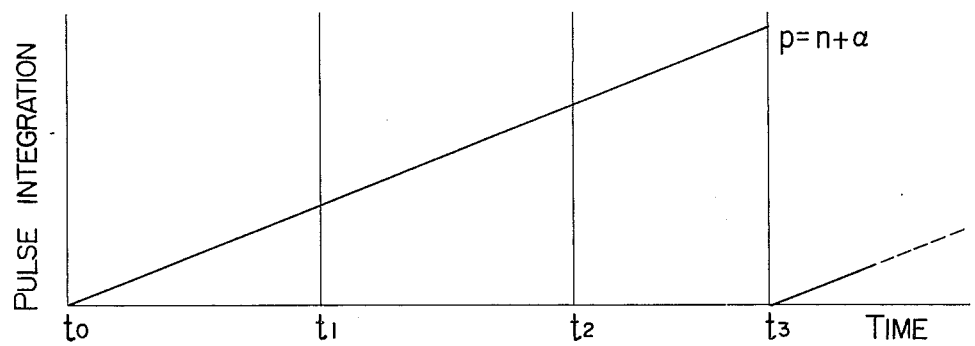
FIGS. 6A to 6F are graphs showing drive pulses generated and chronological change in the speed of the cutter driven by them.
Figure 6B:
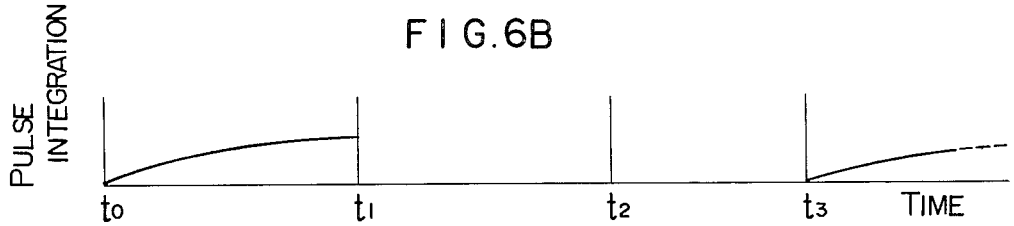
Figure 6C:
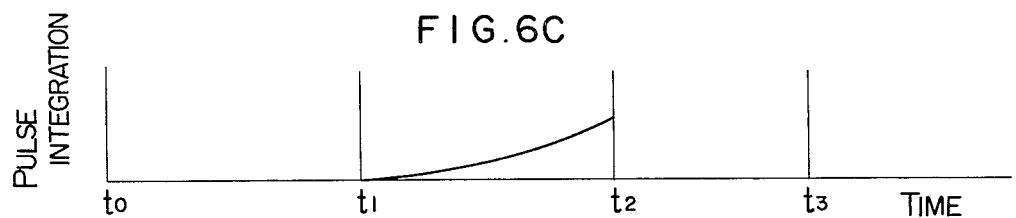
Figure 6D:
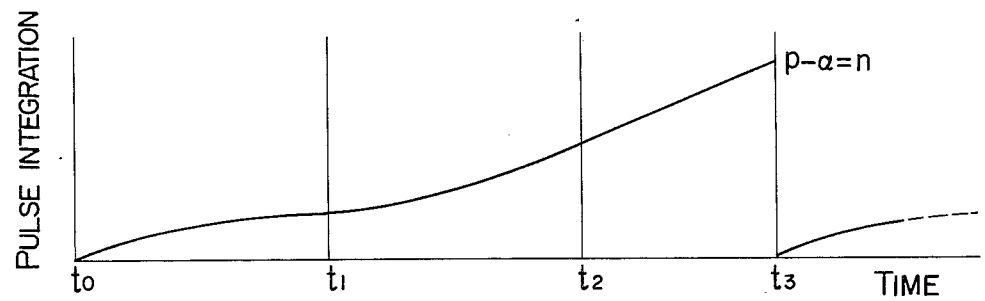
Figure 6E:
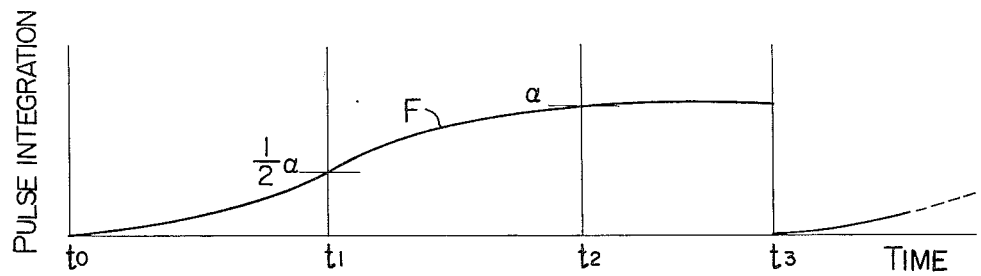

FIGS. 6A through 6E illustrate waveforms at various points in the circuit to more fully understand circuit operation. FIG. 6A shows an integral of the number of output pulses of the divider circuit 9 measured from the time when the blade of the drum 1 reaches the point D. FIG. 6B shows an integral of the pulses derived from the divider circuit 9 through the gate 12. This gate is opened at $t_0$ and closed at $t_1$ when the output of the difference counter 18 reaches ½ $a$ as shown in FIG. 6E.

At $t_1$, the gate 13 is opened to allow the output pulses of the divider circuit 9 to reach the thinning circuit 16. Therefore, the integral of the number of output pulses of the thinning circuit 16 increases gradually from 0 at $t_1$ as shown in FIG. 6C.

At $t_2$, the gate 13 is closed and the gate 14 is opened to allow the output pulses of the divider circuit 9 to be applied directly to the OR circuit 17. Therefore, the integral of the number of output pulses of the OR circuit, as shown in FIG. 6D, is zero at $t_0$ and increases at the same rate as that of FIG. 6B from $t_0$ to $t_1$. From $t_1$ to $t_2$ the FIG. 6D curve follows FIG. 6C. FIG. 6D follows the curve of FIG. 6A after $t_2$.

FIG. 6E shows the output of the difference counter 18 which is the difference between the integral of the number of output pulses of the divider circuit 9 as shown in FIG. 6A and the integral of the number of output pulses of the OR circuit 17 as shown in FIG. 6D. The output of the difference counter 18 reaches ½ $a$ at $t_1$ and $a$ at $t_2$, but does not vary from $t_2$. At $t_3$, the blade of the drum 1 again reaches the point D and the point D detector produces another output signal which opens the gate 12 thereby initiating the next cycle of the operation as above mentioned. At $t_3$, the integral of the number of output pulses of the divider circuit 9 reaches $p = n + \alpha$ corresponding to one cut length of the sheet, while the integral of the number of output pulses of the OR circuit, which are applied to the pulse motor, reaches $p - \alpha = n$, corresponding to one rotation of the pulse motor.

Figure 6F:
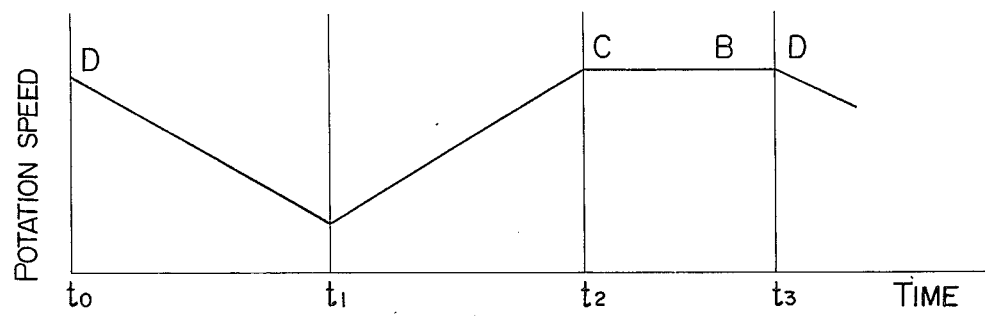

FIG. 6F shows variation of the speed of rotation of the pulse motor which corresponds to the differentiation of the curve shown in FIG. 6D. The curve in FIG. 6D varies at a constant rate from $t_2$ to $t_3$ and the sheet moves at a constant speed. Therefore, the pulse motor rotates at a constant speed so as to be in synchronism with the movement of the sheet from $t_2$ to $t_3$. The blade of the drum 1 reaches the point C at a time between $t_2$ and $t_3$.

The foregoing has dealt with the case where the present invention is applied to a rotary cutter driven by an electric hydraulic-pulse motor.

The electric hydraulic-pulse motor is advantageously suitable for accurate speed control, but complicated in construction and requires a hydraulic device expensively. Hence, it is desirable to use an ordinary DC motor comparatively low in cost in place of the hydraulic-pulse motor. The pulse control device as above-mentioned may be modified to be applied to the speed control of the rotary cutter driven by an ordinary DC motor.

Figure 3:
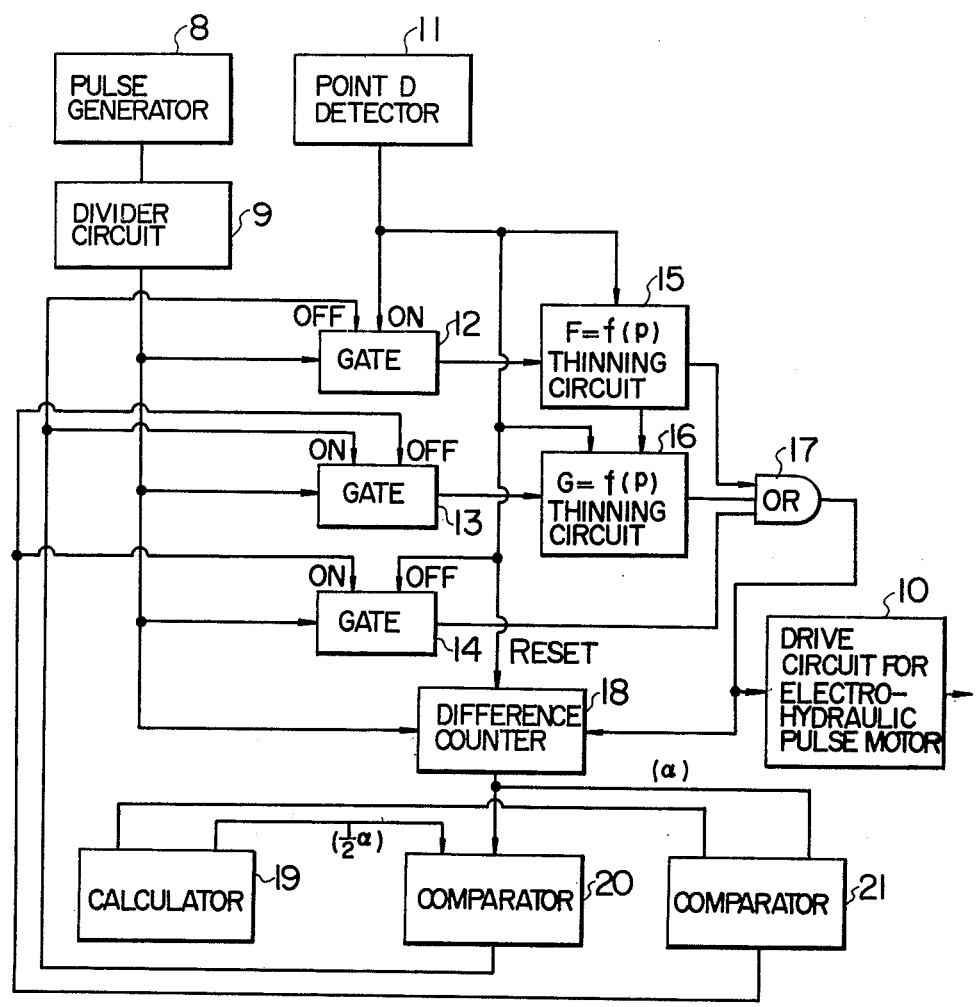
FIG. 3 is a block diagram showing a control circuit for driving an electro-hydraulic pulse motor.
Figure 7:
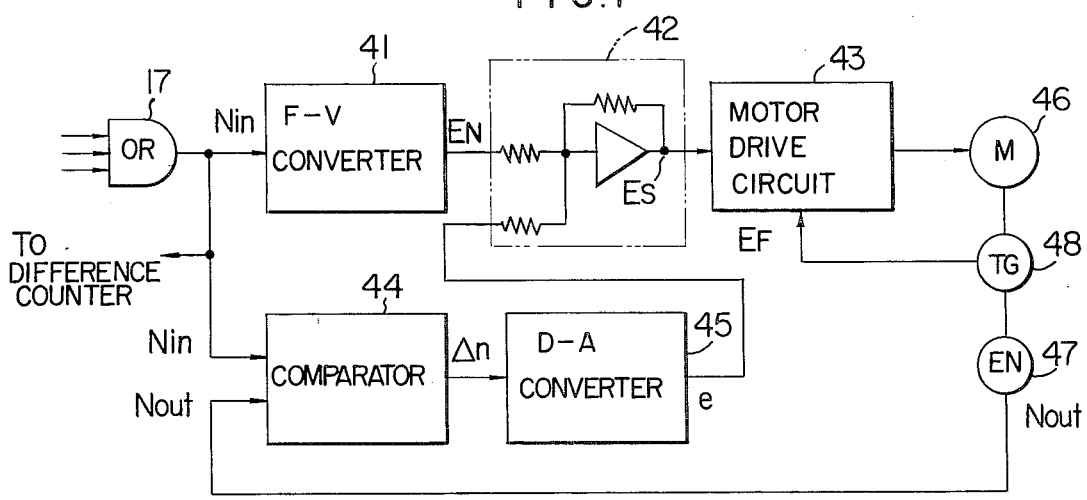
FIG. 7 is a block diagram showing a circuit to be added for applying the present invention to the driving of an ordinary motor.

For this purpose, the output pulse signal of the OR gate 17 in FIG. 3 is converted into an analog signal suitable for driving an ordinary motor, by the circuit shown in FIG. 7.

Fundamentally, the frequency of the output pulses of the OR gate 17 is converted into a DC voltage, whose amplitude is proportional to the frequency of the output pulses, by a well known frequency-voltage converter 41 and the DC voltage is used to drive the DC motor 46. In response to the analog voltage proportional to the pulse frequency, however, the DC motor makes rotations in accordance with the applied voltage but hardly exact one rotation for every N output pulses from the OR gate unlike the pulse hydraulic motor. To eliminate this disadvantage, the resulting rotational error is fed back to a setting circuit to correct the input analog voltage to attain accurate one rotation for every N pulses, thus making the control of rotation of the DC motor as accurately as the pulse hydraulic motor.

To the DC motor 46 is coupled an encoder 47, as shown in FIG. 7, which generates $n$ pulses for each rotation of the motor. The DC motor 46 is required to make exactly one rotation for every $n$ pulses from the OR gate 17. However, if the DC motor 46 fails to make exactly one rotation with $n$ pulses from the OR gate, the number of pulses produced by the encoder 47 during that period is not $n$, but $n \pm \Delta n$ where $\Delta n$ is an error.

In order to eliminate this error, the outputs Nin and Nout of the OR gate 17 and the encoder 47 are compared with each other in pulse form by the comparator 44 and the difference $\Delta n$ between them is converted by a D-A converter 45 into an analog value $e$. On the other hand, the pulses Nin are converted into a DC voltage $E_N$ by the frequency-voltage converter 41.

The DC voltage and the analog value $e$ corresponding to the error are applied to the adder circuit 42, which generates a DC voltage Es corresponding to $E_N + e$, the DC voltage Es being applied to the motor drive circuit 43 to drive the motor 46.

The drive circuit 43 includes such a closed circuit that the voltage Es is compared with the signal $E_F$ generated by the tachogenerator in accordance with motor rotation. Thus the motor is kept in stable rotation at set voltage Es, preventing motor runaway.

If the motor makes exactly one rotation for $n$ (= Nin) pulses, Nout equals $n$ and therefore the comparator output $\Delta n$ is zero.

The output $e$ of the D-A converter 45 is also zero. If the motor makes less than one rotation for Nin (= $n$ pulses), Nout = $n - \Delta n$, and therefore the error $\Delta n$ is produced from the comparator 44, so that the D-A converter 45 produces an output $e$ corresponding thereto. As a result, the output voltage $E_N$ of the frequency-voltage converter 41 is changed to a level higher by $e$. The voltage thus changed is applied to the motor drive circuit 43 thereby increasing the motor rotational speed. In the case where the motor makes more than one rotation for $n$ input pulses, by contrast, $\Delta n$ is negative and so is $e$, thus reducing the motor speed.

In driving an electric hydraulic-pulse motor, the characteristics thereof require that the number of output pulses $n$ of the OR gate 17 coincide with the number of pulses corresponding to one rotation of the motor. Such a condition is not necessarily imposed on the driving of an ordinary electric motor, and therefore the value of $n$ may be selected as desired. Generally, it is desired to select the value of $n$ as large as possible, in order to make higher the accuracy of the frequency-voltage converter 41, which may be a kind of integrating circuit, and also minimize the delay in operation.

I claim:

1. An apparatus for controlling the speed of a rotary cutter driven by an electric motor for cutting to length a sheet material continuously supplied to said rotary cutter comprising:

first means for producing a first pulse train having a pulse rate in synchronism with the feed rate of said sheet material, second means for decreasing the pulse rate of said first pulse train applied thereto thereby to produce a second pulse train and operative selectively in a first mode where the rate of decrease of the pulse rate increases progressively according to a predetermined first pattern and in a second mode where the rate of decrease of the pulse rate decreases progressively according to a predetermined second pattern, detecting means for producing a first signal when the blades of said rotary cutter reach a predetermined position after cutting, comparator means for producing second and third signals when the difference between the number of pulses of said first pulse train applied to said second means and that of said second pulse train produced by said second means reaches a predetermined first value and a predetermined second value, respectively, first gate means for causing said second means to operate in said first mode during a first period from occurrence of said first signal to occurrence of said second signal and to operate in said second mode during a second period from occurrence of said second signal to occurrence of said third signal thereby to apply said second pulse train produced by said second means to third means during said first and second periods, second gate means for applying said first pulse train to said third means during a third period from occurrence of said third signal to occurrence of said first signal, and said third means for converting the pulses applied thereto into a DC voltage whose amplitude is proportional to the pulse rate of said applied pulses, said DC voltage being applied to said electric motor for driving the same.

2. An apparatus according to claim 1, in which said predetermined second value is a number equal to the difference between the number of pulses of said first pulse train produced while the sheet material is advanced by a length to which said sheet material is to be cut and said predetermined first value is one half of said second value.

3. An apparatus according to claim 1 in which said second means includes a first synchronous rate multiplier with pulse train applied thereto, a subtraction counter, said input pulses being applied through a first divider circuit to said subtraction counter, the output of said subtraction counter being furnished an output-to-input pulse ratio for said first synchronous rate multiplier, and a second synchronous rate multiplier with a pulse train applied thereto an addition counter, a second divider, said input pulses being applied through said second divider circuit to said addition counter, and the output of said addition counter supplied as an output-toinput pulse number ratio to said second synchronous rate multiplier.

4. An apparatus according to claim 3, in which said first and second synchronous rate multipliers are combined into a common synchronous rate multiplier and said subtraction and addition counters are combined into a common counter with addition and subtraction input terminals, said input pulses being applied through a first divider circuit to said subtraction input terminal during said first period, said input pulses being applied through a second divider circuit to said addition input terminal during said second period.

5. An apparatus according to claim 1, in which the rate of decrease of said pulse rate increase as a function of the number of pulses of said first pulse train applied thereto and the rate of increase of said pulse rate decreases as a function of the number of pulses of said first pulse train applied thereto.

6. An apparatus according to claim 5, in which the rate of decrease of said pulse rate relative to the number of pulses of said first pulse train is equal to the rate of increase of said pulse rate relative to the same number of pulses of said first pulse train.

7. An apparatus according to claim 1, in which said third means comprises comparator means for producing an error signal relating to the difference between the pulse rate of said applied pulses and the pulse rate of pulses indicative of the speed of said electric motor driven by said DC voltage, and means for correcting the amplitude of said DC voltage according to said error signal.

* * * * *